United States Patent
Dutta et al.

(10) Patent No.: US 8,364,733 B2
(45) Date of Patent: Jan. 29, 2013

(54) METHOD AND SYSTEM FOR OPERATING A RATING SERVER BASED ON USAGE AND DOWNLOAD PATTERNS WITHIN A PEER-TO-PEER NETWORK

(75) Inventors: Rabindranath Dutta, Austin, TX (US); Janani Janakiraman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 599 days.

(21) Appl. No.: 12/253,780

(22) Filed: Oct. 17, 2008

(65) Prior Publication Data
US 2009/0030969 A1    Jan. 29, 2009

Related U.S. Application Data

(63) Continuation of application No. 09/817,111, filed on Mar. 26, 2001, now Pat. No. 7,539,664.

(51) Int. Cl.
*G06F 17/00* (2006.01)
(52) U.S. Cl. ........ 707/967; 707/723; 707/706; 707/748; 707/769
(58) Field of Classification Search .................. 707/967, 707/723, 706, 748, 769
See application file for complete search history.

(56) References Cited

U.S. PATENT DOCUMENTS

| | | | |
|---|---|---|---|
| 5,867,799 A * | 2/1999 | Lang et al. ............................ | 1/1 |
| 6,061,667 A * | 5/2000 | Danford-Klein et al. ..... | 705/400 |
| 6,199,047 B1 * | 3/2001 | Dimino et al. ............... | 705/7.29 |
| 2002/0112035 A1 * | 8/2002 | Carey et al. .................... | 709/219 |
| 2002/0152215 A1 * | 10/2002 | Clark et al. ..................... | 707/10 |
| 2003/0014759 A1 * | 1/2003 | Van Stam ........................ | 725/97 |

OTHER PUBLICATIONS

Hibbard, "Can peer-to-peer grow up?", Red Herring, Dec. 4, 2000, pp. 1-7.
Heltzel, "Search in Progress", Business 2.0, Sep. 12, 2000, pp. 1-2.
"The Gnutella Protocol", Jul. 2, 2000, pp. 1-6. http://gnutella.wego.com.
"Gnutella Support", Jun. 26, 2000, pp. 1-8. http://gnutella.wego.com.

* cited by examiner

*Primary Examiner* — Sana Al Hashemi
(74) *Attorney, Agent, or Firm* — Yee & Associates, P.C.; Steven L. Bennett

(57) ABSTRACT

A method and a system is presented for pruning a peer-to-peer network such that a peer-to-peer search within the peer-to-peer network is initiated beginning with those nodes on which relevant content has previously been found for particular search keywords. For each completed search, a peer node gathers client rating results and then forwards the rating information to a rating server; these results reflect the degree to which searches successfully located content for keywords in a search using particular peer nodes. A rating server maintains a database of results received from nodes. Prior to initiating a new search at a peer node, the peer node consults one or more rating databases to retrieve a set of initial nodes to which the node should initiate the new search in order to maximize the speed and success of finding relevant content. The node then performs the new search using the set of initial nodes.

36 Claims, 8 Drawing Sheets

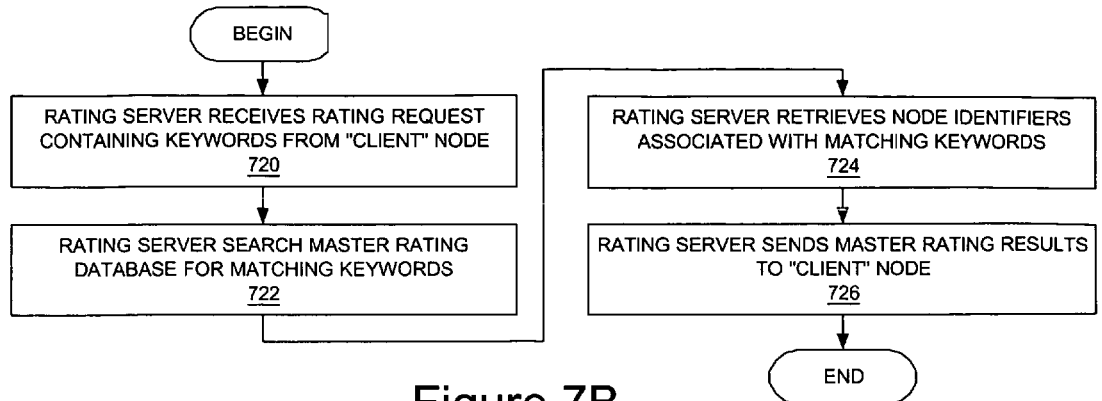
Figure 7B
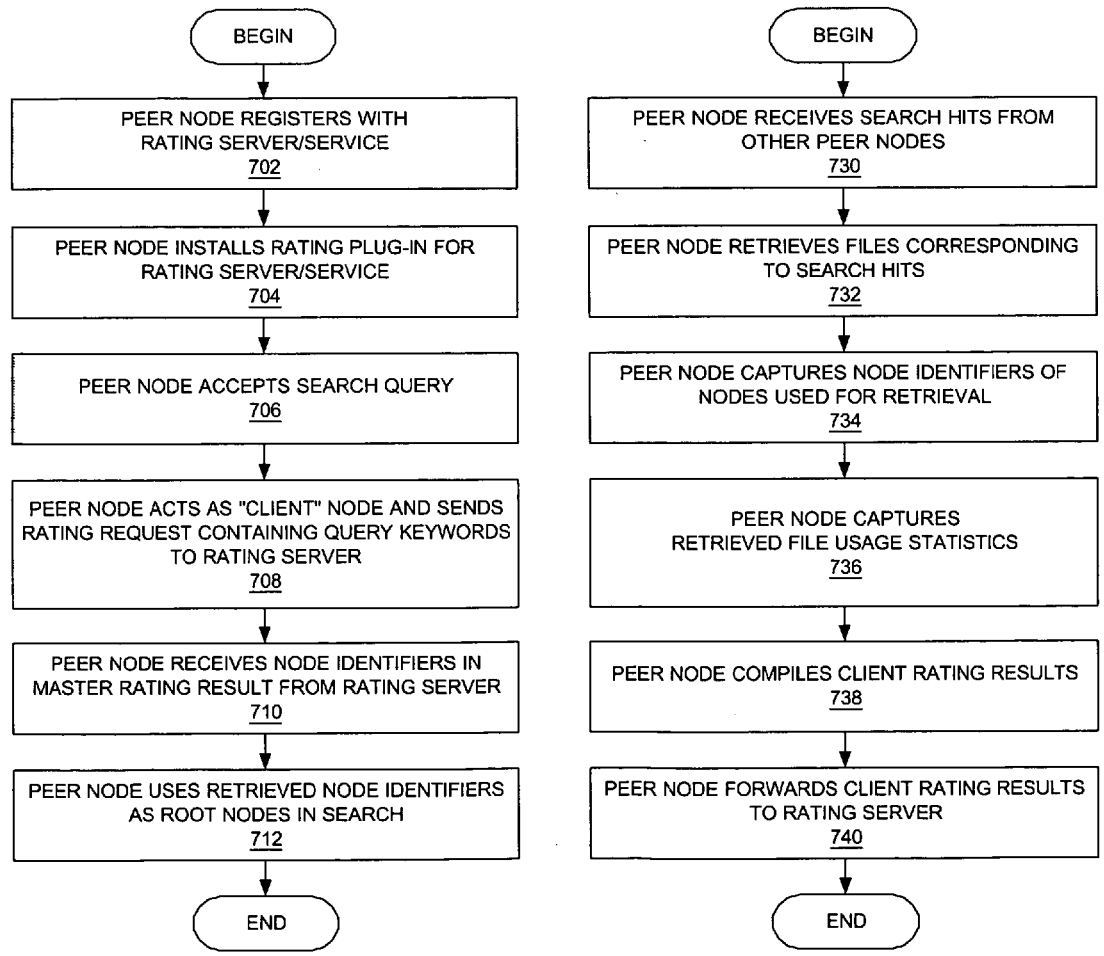
Figure 7A
Figure 7C

METHOD AND SYSTEM FOR OPERATING A RATING SERVER BASED ON USAGE AND DOWNLOAD PATTERNS WITHIN A PEER-TO-PEER NETWORK

This application is a continuation of application Ser. No. 09/817,111, filed Mar. 26, 2001, status allowed.

BACKGROUND OF THE INVENTION

1. Field of the Invention

The present invention relates to an improved data processing system and, in particular, to a method and system for operating a database. Still more particularly, the present invention provides a method and system for database and/or file accessing and searching.

2. Description of Related Art

The amount of Internet content continues to grow rapidly and to outpace the ability of search engines to index the exploding amount of information. The largest search engines cannot keep up with the growth as it has been estimated that search engines only index about 5% to 30% of the information content on the Web. Hence, at the current time, the majority of Web content is not classified or indexed by any search engine.

There are currently two broad categories of systems which provide the service of categorizing and locating information on the Web: (1) search engines that return direct hits to sites containing data that match inputted queries, such as AltaVista; (2) Web portals that organize the information into categories and directories, such as Yahoo!. These systems operate using a traditional client-server model with packet-switched data interchange.

Recently, the traditional Web client-server paradigm has been challenged by distributed file-sharing systems that support a peer-to-peer model for exchanging data. In peer-to-peer networks, each computer platform, or node, can operate as a hub, i.e., each node has both client functionality and server functionality. Each node has a list of addresses, most commonly Internet Protocol (IP) addresses, of several other nodes, or "peer nodes". These nodes can directly communicate with each other without a central or intermediate server.

Nodes within a peer-to-peer network form a distributed file-sharing system in which the nodes act cooperatively to form a distributed search engine. When a user at a node enters a search query, the search query is copied and sent to its list of peer nodes. Each peer node searches its own databases in an attempt to satisfy the search query. Each node copies the query to each node in its list of peer nodes while observing a time-to-live value in the query message. If a resulting query hit is made, then the node returns some type of query results to the originating node. A peer-to-peer search quickly fans out amongst a large number of nodes, which provides a useful manner for finding new content that has not yet been indexed by the large search engines.

In a peer-to-peer data sharing network, each node participates in a process of connecting and disconnecting with other nodes. When a connection is established with another node, a user or the user's computer cannot quickly determine whether or not it is worth browsing or searching the content of the newly connected peer node. Since the search might fan out within a widely distributed network, a peer-to-peer search can often reach nodes that do not contain any content that would be of interest to the user.

In addition, although the fan-out across an entire distributed peer-to-peer network made be large, a given node has a limited number of connections that it can support at the same time. Eliminating uninteresting or unproductive connections would speed up a peer-to-peer search for relevant content.

Therefore, it would be advantageous to provide a method and system for limiting a peer-to-peer search within a peer-to-peer data sharing network to those nodes that contain relevant or interesting content. It would be particularly advantageous to increase the ability of a peer-to-peer search to successfully find relevant content based on prior peer-to-peer usage and download patterns.

SUMMARY OF THE INVENTION

A method, a system, an apparatus, and a computer program product are presented for pruning a peer-to-peer network such that a peer-to-peer search within the peer-to-peer network is initiated beginning with those nodes on which relevant content has previously been found for particular search keywords. For each completed search, a peer node gathers client rating results and then eventually forwards the rating information to a rating server. The rating results reflect the degree to which searches successfully located content for keywords in a search using particular peer nodes. A rating server maintains a database of rating results received from peer nodes.

Prior to initiating a new search at a peer node, the peer node consults one or more rating databases to retrieve a set of initial nodes to which the node should initiate the new search in order to maximize the speed and success of finding relevant content. The node then performs the new search using the set of initial nodes.

A rating server may support a variety of registration modes for registering peer nodes that access its rating database, and the rating server may support a variety of financial transaction modes with the different registration modes. As part of the registration process, a peer node may download and install a rating plug-in that generates the client rating results

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 7A is a flowchart depicting a process for initiating a search on a peer node within a peer-to-peer network in accordance with the present invention;

FIG. 7B is a flowchart depicting a process on a rating server for obtaining master rating information on behalf of a peer node prior to activating a search at the peer node in accordance with the present invention; and FIG. 7C is a flowchart depicting the processing of search results at a peer node within a peer-to-peer network in order to generate a master rating database in accordance with the present invention.

DETAILED DESCRIPTION OF THE INVENTION

The present invention provides a method and system for limiting peer-to-peer searches within a peer-to-peer data sharing network to those nodes that contain relevant or interesting content. As background, a typical organization of hardware and software components within a distributed data processing system is described prior to describing the present invention in more detail.

Figure 1A:
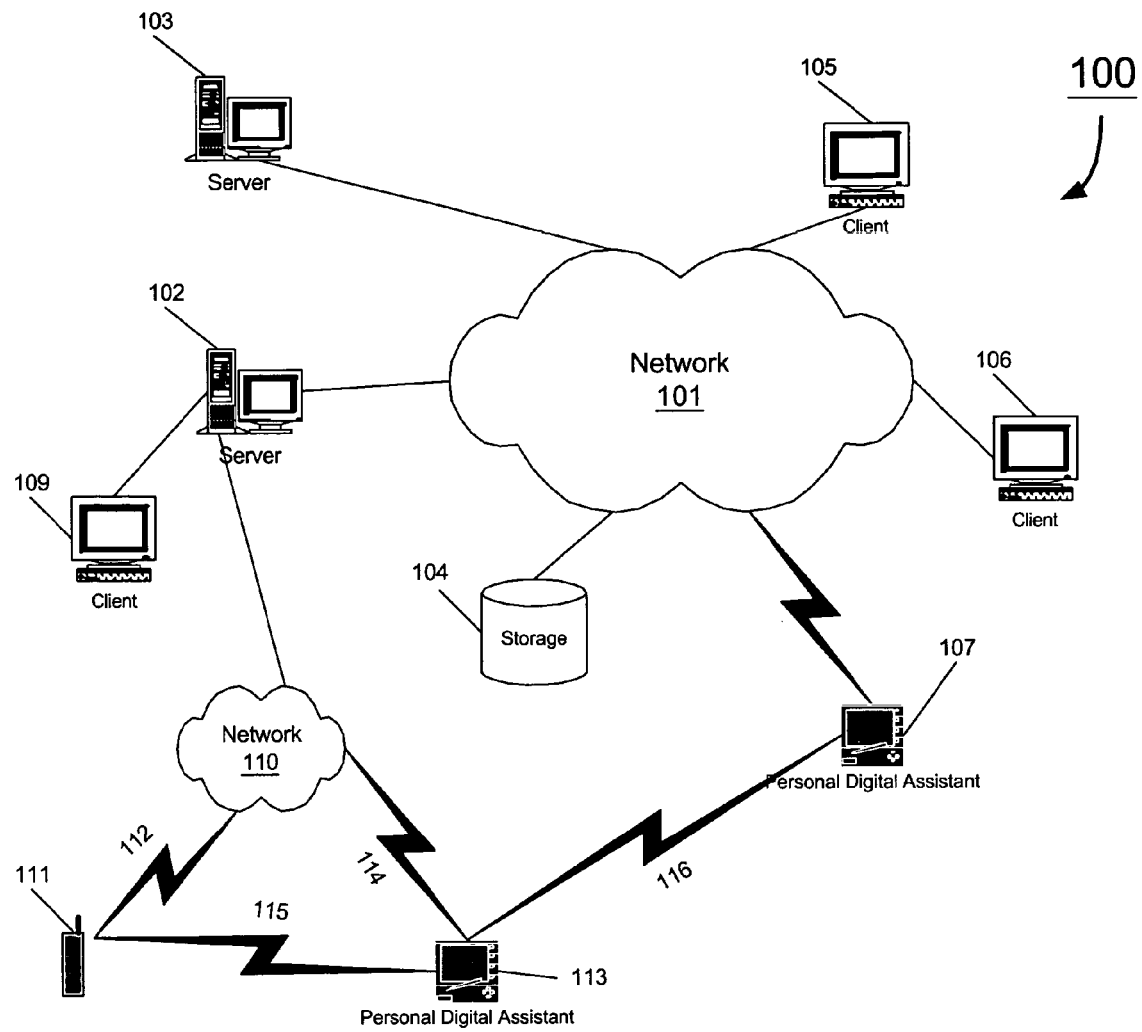
FIG. 1A depicts a typical distributed data processing system in which the present invention may be implemented.

With reference now to the figures, FIG. 1A depicts a typical network of data processing systems, each of which may implement the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 117 via wireless communication link 116.

The present invention could be implemented on a variety of hardware platforms; FIG. 1A is intended as an example of a heterogeneous computing environment and not as an architectural limitation for the present invention.

Figure 1B:
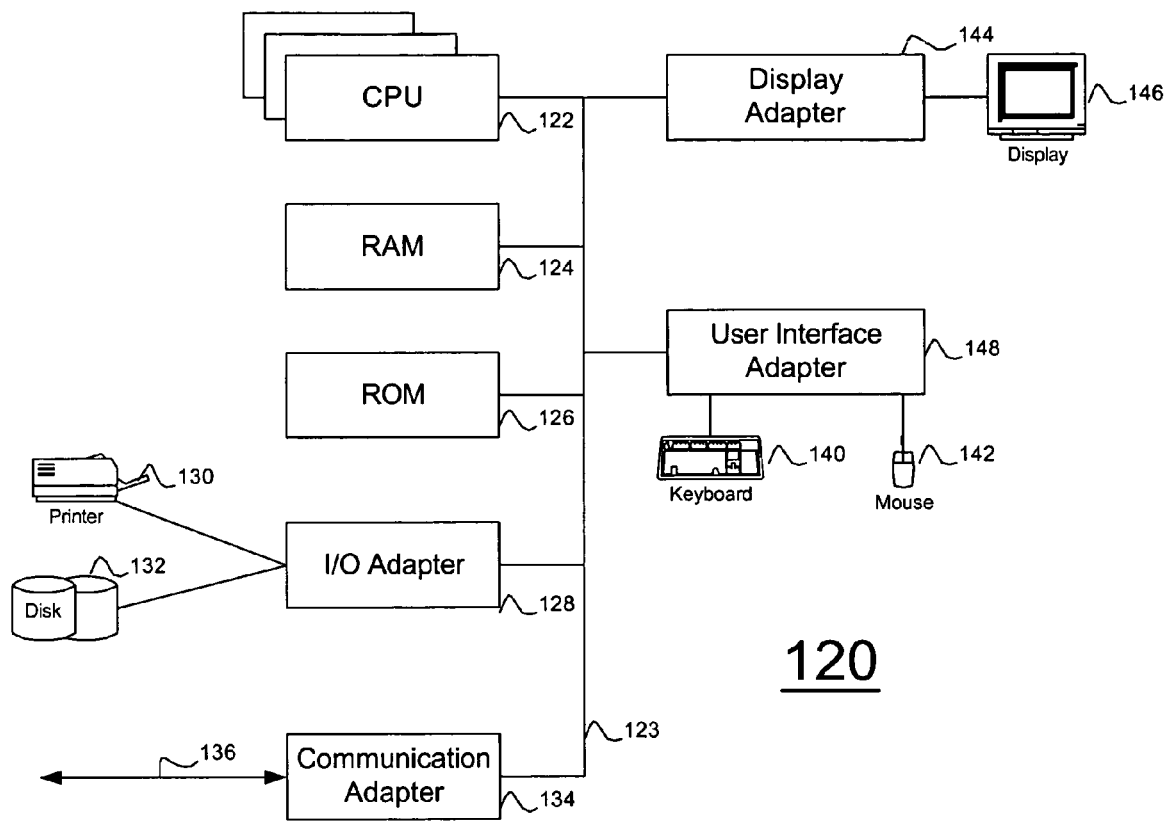
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. In other words, one of ordinary skill in the art would not expect to find similar components or architectures within a Web-enabled or network-enabled phone and a fully featured desktop workstation. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files. Hence, it should be noted that the distributed data processing system shown in FIG. 1A is contemplated as being fully able to support a variety of peer-to-peer subnets and peer-to-peer services.

The present invention may be implemented on a variety of hardware and software platforms, as described above. More specifically, though, the present invention is directed to providing a method and system for accessing information on a network that includes peer-to-peer networks or subnets. As background, a typical organization of software components within a peer-to-peer network is described prior to describing the present invention in more detail.

Figure 2A:
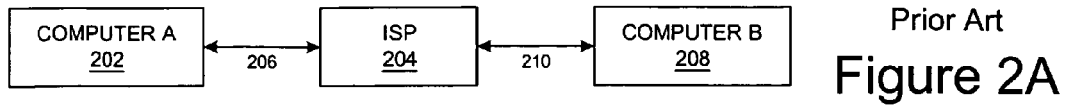
FIG. 2A is a block diagram that depicts a simplified, Internet-based connection between two computers.

With reference now to FIG. 2A, a block diagram depicts a simplified, Internet-based connection between two computers. Computer 202 communicates with ISP (Internet Service Provider) 204 across communication link 206, and computer 208 communicates with ISP 204 across communication link 210. Users of computers 202 and 208 can employ browsers and other networked applications, such as a peer-to-peer file sharing application, to send and receive information across a network, which includes the Internet in this example. Those of ordinary skill in the art will recognize that Internet-based connections between nodes 204 and 208 also may be achieved without using an ISP. For example, a Local Area Network or corporate intranet may be used. The use of an ISP is not intended to be an architectural limitation of the present invention.

Figure 2B:
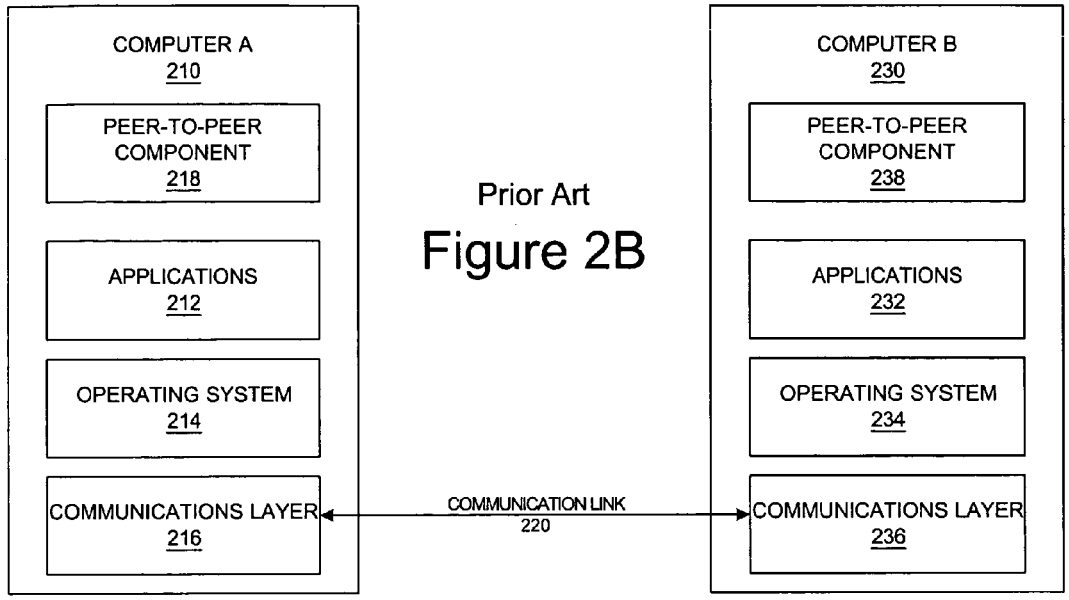
FIG. 2B is a block diagram that depicts software components within two computers that are operating as nodes within a peer-to-peer network.

With reference now to FIG. 2B, a block diagram depicts software components within two computers that are operating as nodes within a peer-to-peer network. Computer 210 has network-enabled applications 212 that use operating system 214 for various services, such as network communication services provided by communications layer 216. In addition, peer-to-peer component 218 may be a stand-alone applet or an application that provides peer-to-peer networking functionality to computer 210. Communication link 220 supports data traffic between computer 210 and computer 230, which has software components that correspond to those shown in computer 210: applications 232, operating system 234, communications layer 236, and peer-to-peer component 238. Peer-to-peer components 218 and 238 may provide support for a distributed, peer-to-peer file sharing function, as shown in more detail in FIG. 2C.

Figure 2C:
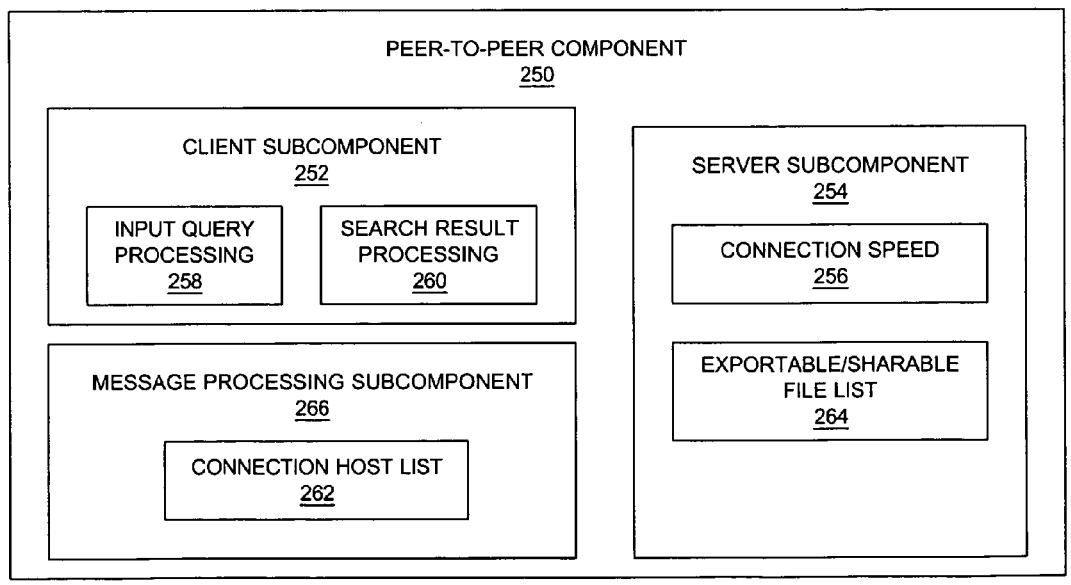
FIG. 2C is a block diagram depicting typical software subcomponents within a peer-to-peer software component that contains file sharing functionality.

With reference now to FIG. 2C, a block diagram depicts typical software subcomponents within a peer-to-peer software component that contains file sharing functionality. As noted previously, in peer-to-peer networks, each computer platform, or node, can operate as a hub, i.e., each node has both client functionality and server functionality. Peer-to-peer component 250 contains client subcomponent 252 and server subcomponent 254.

The method by which nodes in a peer-to-peer network connect with each other may vary with the type of peer-to-peer network. Generally, a client is dynamically assigned an IP address by an ISP when the client connects to the ISP, so the IP address possibly changes with each client session. In some implementations, a peer-to-peer connection between nodes in a peer-to-peer network is initiated when a user at a node manually enters either a domain name or an IP address (and optionally a port number) of an application of another node that is known to support peer-to-peer networking. The peer-to-peer application then establishes a connection with the other node at the specified address as a starting point within the network. For example, applications using the Gnutella protocol operate in this manner. Gnutella nodes also exchange connection speed, such as connection speed 256, that describe the speed of the network connection that is being used by the node. It should be noted, however, that the present invention can be implemented on a variety of peer-to-peer networks and is not limited by the peer-to-peer protocol that is used by the file sharing applications.

Nodes within a peer-to-peer network can act as a distributed file sharing system in which the nodes act cooperatively to form a distributed search engine. Client subcomponent 252 contains input query processing function 258 and search result processing function 260. When a user at a node enters a search query, the search query is copied to a list of peer nodes to which the node is connected, such as connection host list 262.

When a node receives the query, its server component, such as server component 254, processes the query. Each peer node searches its own databases in an attempt to satisfy the search query. Alternatively, a user has previously specified a list of files that the user is willing to export or share, such as file list 264, and the server subcomponent searches this list to find one or more files that satisfy the search query. Alternatively, rather than searching through a list of file names, the application may search the node's permanent storage for content that matches the search query. Depending on certain parameters within the query message, the node also forwards the query, e.g., by using message processing subcomponent 266, to each node in its list of connected peer nodes. If a resulting query hit is made, then the node returns some form of query results to the peer node that contacted it or to the originating node. In this manner, the search quickly fans out amongst a large number of nodes.

Figure 2D:
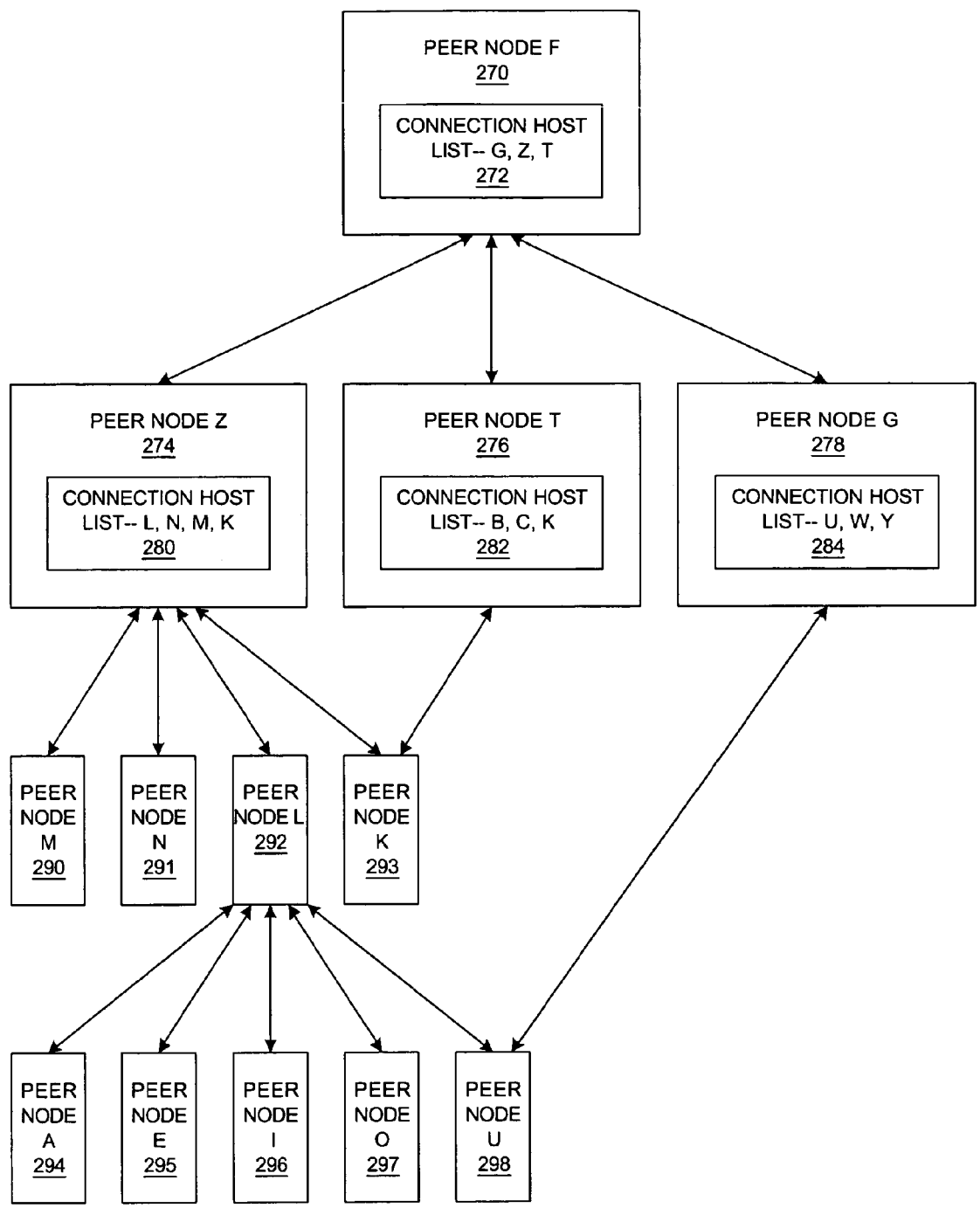
FIG. 2D is a block diagram depicting a typical network topology of nodes within a peer-to-peer network.

With reference now to FIG. 2D, a block diagram depicts a typical network topology of nodes within a peer-to-peer network. Peer node 270 has a connection host list 272 that identifies nodes 274-278 to which peer node 270 is connected, and nodes 274-278 have their own connection host lists 280-284, respectively. In this example, node 274 connects to nodes 290-293, and node 292 connects with nodes 294-298.

It should be noted that peer-to-peer networks do not have a structured topology, such as a strictly hierarchical organization amongst the nodes. In this example, node 276 also connects with node 293, and node 278 also connects with node 298. However, in order to distinguish immediately connected nodes from distant nodes, the set of nodes to which a particular node connects may be termed the "root nodes" of the particular node.

As noted above, the present invention is not limited to any particular peer-to-peer protocol that is used to implement the present invention. As background information, though, the Gnutella protocol is described in more detail as an example of the manner in which information may be passed in a peer-to-peer network between nodes that support a file sharing application. Reference may be made to the above description for FIG. 2C and FIG. 2D for components that would support file sharing within a peer-to-peer network using a protocol similar to Gnutella.

Gnutella is an Internet-based file searching/sharing program that combines both search engine functionality and file server functionality in a single application. When a user enters a search term into a Gnutella-enabled application at a node in the peer-to-peer network, a query message is generated with the appropriately formatted information, and the message is sent as a network packet to the user node's connected peers, i.e., peer nodes with which the user's node has already established a connection or session. Special codes within a Gnutella message header indicate the type of message, and each type of message has a unique code.

Any node within a certain distance from the user's node in the peer-to-peer network, i.e., within a certain node "hop count", will receive the query message; there is no mechanism to kill a query. As a query message moves through the connected nodes, a time-to-live (TTL) data field, which represents the hop count, is decremented. If the TTL field reaches zero, then the receiving node should not forward the query message, i.e., it should "drop the packet". Otherwise, the receiving node forwards the query message.

Each message contains a Globally Unique Identifier (GUID). When a new message is generated, a new GUID is also generated and placed within the new message. The manner in which the GUID is generated is not specifically specified by the Gnutella standard. When any message is received, the GUID is compared to a list of GUIDs, each of which were stored when its corresponding message was received. If the GUID is in the list, this fact indicates that the receiving node has seen this particular message previously because the GUIDs are supposed to be unique. Hence, if the GUID is in the list, then the node should not forward the received message because the receiving node's peer nodes would have also seen the message, and the packet can be dropped.

In addition, if the receiving node can fulfill the query, then the node creates a query hit (query reply) message and returns it to the node that originated the query message. The query hit message contains the address and port number of the responding node so that the originating node can send a message back to the responding node to retrieve a file if desired. The query hit message also contains the connection speed of the responding node and the number of search hits. For each query hit, the query hit message also contains the name of the file that satisfies the query and the size of that file. Other information may be included, such as length of the data content within the message, etc.

Assuming that the originating node has sufficient communication bandwidth, the results of the search should be received within a relatively short amount of time. The search results are stored or cached as they are received. The Gnutella-enabled application then presents the search results to the user in some fashion, and the user may select, through some type of user interface in the application, a filename that the user desires to retrieve. The application, which has stored the search results that include one or more nodes that responded with a search hit, can download a selected file to the user's node. Simple HTTP messages can be used for the download operation, such as a "Get" or a "Put" message (for a Gnutella "Push" request).

The Gnutella protocol operates without a central server. Unlike typical search engines, Gnutella searches anonymously, and there is no index. There is also no authentication process nor authorization process. There are other types of messages within the Gnutella protocol, such as "Ping" and "Pong", for discovering other nodes on the network and for responding to "Ping" messages. Additionally, a "Push" request message allows a node within the network but behind a firewall to be contacted to push a file to the outside of the firewall rather than attempting to pull the file from inside the firewall. It should be noted that the Gnutella protocol specification is an open specification and is subject to modification and fragmentation over time.

The present invention provides a method and system for limiting peer-to-peer searches within a peer-to-peer data sharing network, such as that described above with respect to FIGS. 2A-2D, to those nodes that contain relevant or interesting content. More specifically, though, the present invention increases the ability of a peer-to-peer search to successfully find relevant content based on prior peer-to-peer usage and download patterns. From one perspective, the present invention may be viewed as attempting to avoid searching certain nodes within a peer-to-peer network for a current search. From another, more positive perspective, the present invention may be viewed as pruning a peer-to-peer network such that a peer-to-peer search within the peer-to-peer network is initiated on those nodes that have previously shown to have a history of productive searches that would be relevant to content for a current search. In other words, a peer-to-peer network is pruned to a peer-to-peer subnetwork based on historical search rating information, and a current search is initiated on the peer-to-peer subnetwork.

In summary, the present invention provides the establishment of a methodology for rating peer nodes within a peer-to-peer network. A user of a node within the peer-to-peer network is provided with an option to allow the node to participate in the rating methodology. If the user decides to allow the node to participate in the rating methodology, the user proceeds to register the node with one or more centralized rating servers. A rating server maintains a database of results of prior peer-to-peer searches; these results reflect the degree to which a prior peer-to-peer search successfully located content for a given search within particular peer nodes. Prior to initiating a new search at a node, the node consults one or more rating databases to retrieve a set of initial nodes to which the node should initiate the new search in order to maximize the speed and success of finding relevant content. The node then performs the new search using the set of initial nodes. The present invention is described in more detail in the following description of the remaining figures.

Figure 3:
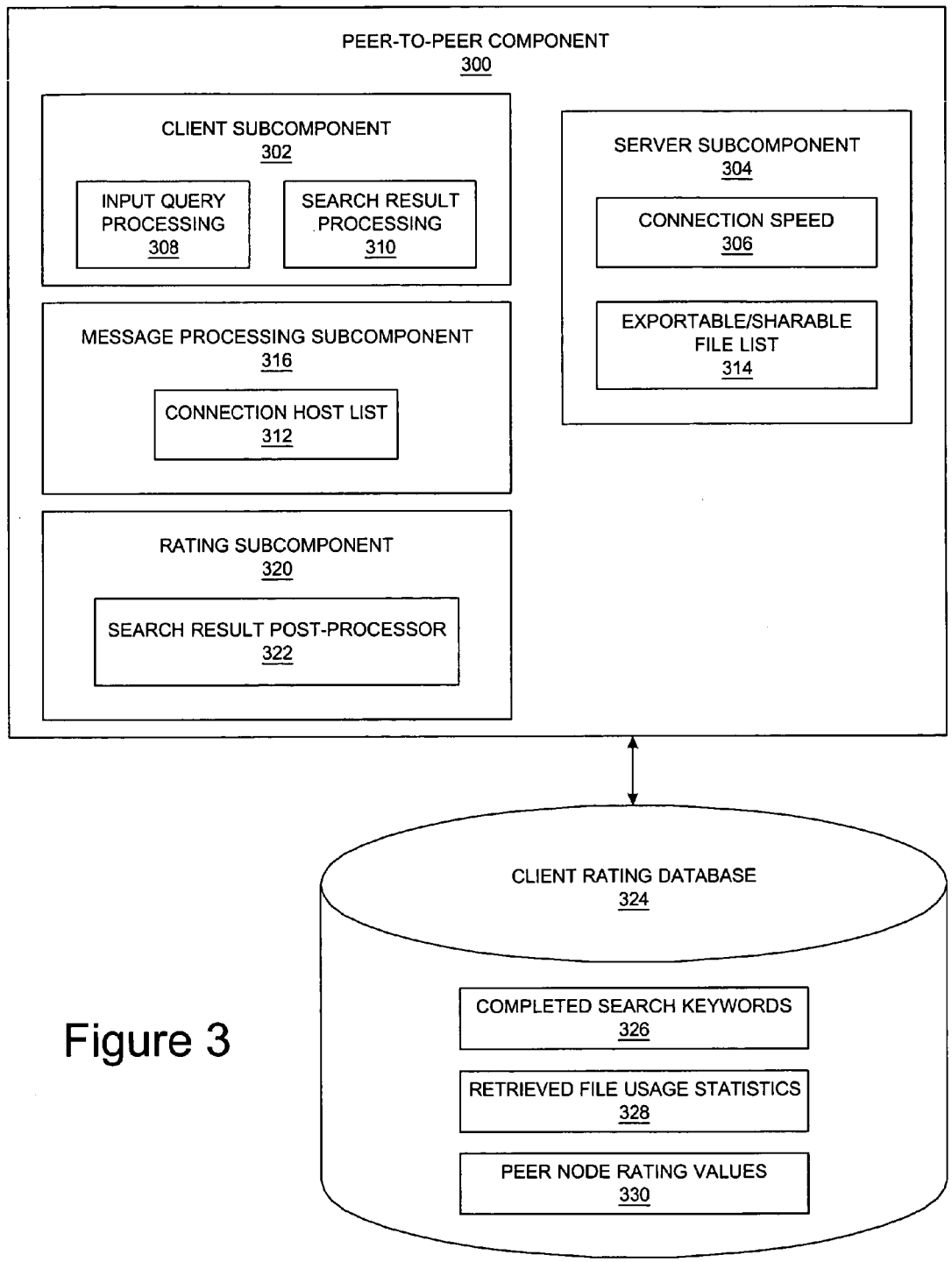
FIG. 3 is a block diagram depicting software subcomponents within a peer-to-peer software component for peer-to-peer content searching and file sharing functionality in accordance with a preferred embodiment of the present invention.

With reference now to FIG. 3, a block diagram depicts software subcomponents within a peer-to-peer software component for peer-to-peer content searching and file sharing functionality in accordance with a preferred embodiment of the present invention. FIG. 3 depicts a peer-to-peer software component that is similar to the component shown in FIG. 2C, although FIG. 3 has additional functionality.

As noted previously, in peer-to-peer networks, each computer platform, or node, can operate as a hub, i.e., each node has both client functionality and server functionality. Peer-to-peer component 300 contains client subcomponent 302 and server subcomponent 304.

In a manner similar to that described above for FIG. 2C, FIG. 3 depicts some typical peer-to-peer functionality. Nodes within a peer-to-peer network can act as a distributed file sharing system in which the nodes act cooperatively to form a distributed search engine. Client subcomponent 302 contains input query processing function 308 and search result processing function 310. When a user at a node enters a search query, the search query is copied to a list of peer nodes to which the node is connected, such as connection host list 312. Connection parameters 306 can be shared amongst peer nodes so as to provide information about the communication capabilities of a peer node. A user may have previously specified a list of files that the user is willing to export or share, such as file list 314. Depending on certain parameters within the query message, the node also forwards the query, e.g., by using message processing subcomponent 316, to each node in its list of connected peer nodes.

In contrast to FIG. 2C, FIG. 3 depicts a peer node with rating subcomponent 320. The present invention provides a rating methodology for rating searches that are completed by peer nodes. In the prior art, when a peer-to-peer search is completed, the peer node that originated the search receives a list of nodes, and the user determines whether to retrieve or download the file from another peer node that caused a search hit. As a result, some, none, or all of the files that caused a search hit may be retrieved. Further, the user then determines the usefulness of each search hit. From that point in time, the user may use the retrieved file frequently or infrequently.

To create distributed intelligence about the file searching capabilities of the peer-to-peer network, the present invention attempts to capture post-search information about the usefulness of retrieved files. An assumption is made that a retrieved file that is used frequently has more value in relation to the peer-to-peer search than a retrieved file that is used less frequently. Other assumptions may be made, such as the observation that a retrieved file that is kept for a long period of time has more value in relation to the peer-to-peer search that a retrieved file that was kept for a shorter period of time.

Hence, after a peer node's own search query has been processed by search result processing function 310, search result post-processing function 322 analyzes the post-search activity with respect to the search hits. As information is gathered, the peer node maintains client rating database 324 with ratings for the nodes from which files have been retrieved. Eventually, the rating information within a peer node's rating database is sent to a master rating database for compilation and storage with the rating results from other peer nodes in the peer-to-peer network. The use of the master rating database is explained in more detail further below.

When a search has been completed, a peer node has compiled a list of query hits from other peer nodes that have reported the hits for the peer node's search query. In a preferred embodiment, search result post-processor 322 obtains a copy of the search query and the compiled list of query hits. Keywords from completed search queries 326 are then indexed into the client rating database.

As the user of the peer node retrieves and uses those files, search result post-processor 322 monitors the usage of the search result files and rates each file based on the usage of those files. Using functionality within the operating system of the peer node, the search result post-processor can perform a variety of actions to determine how and when the retrieved files are used. Depending on the type of file, various rating criteria can be established for each type of file. For example, if a user retrieves a digital video file, then the search result post-processor can monitor the number of times that the file is viewed. Other types of active content files can be monitored for the number of times that a file is played.

The manner in which rating information is generated by a peer node may vary depending on the implementation. For example, the following factors may influence the gathering of information: the purposes of the search; the types of files that are retrieved; the monitoring capabilities of the client machine on which the peer-to-peer software is operating; optional client and/or server parameters that restrict and/or guide the software component in gathering and analyzing rating information; or other factors not listed herein.

As noted above, active content files can be monitored for the number of times that a file is played. Using various functions within a client machine's operating system, the search result post-processor can monitor other actions performed with other types of retrieved files. For example, the search result post-processor can monitor and record or log the number of times that a general file is opened or the number of times that an executable file has been executed. The search result post-processor could also monitor how long a file is kept before it is deleted.

It should be noted that the ranking process is an active, ongoing, process. If a retrieved file is used repeatedly by the user, then the ranking of the file for its one or more associated keywords is increased. If a retrieved file is kept for a relatively long period, then the ranking of the file for its one or more associated keywords is increased. It should also be noted that the manner in which the relative weightings are increased or decreased may be done by a variety of well-known statistical methods. Since the manner and frequency of use of a peer-to-peer network by a user of a peer node may vary greatly across different users, the ratings may be normalized in some manner if desired.

The methods by which the search result post-processor performs the monitoring actions may vary depending on the software architecture of the peer-to-peer software component and the relationship of the search result post-processor to the peer-to-peer software component. For example, the peer-to-peer software component may be an application with an extensible API, and the search result post-processor may be embodied within a rating plug-in that is structured to operate within a runtime environment provided by the peer-to-peer application. The search result post-processor can then obtain copies of the search query and compiled lists of query hits from the peer-to-peer application as needed.

Alternatively, the rating plug-in can register call-back routines within the peer-to-peer application such that routines within the rating plug-in are called to process a copy of the search query and the compiled list of query hits as they become available. Although other well-known mechanisms of interfacing software components could used, this type of interfacing between the rating plug-in and the peer-to-peer component may be the most efficient manner of coordinating activities between the two modules because the rating plug-in may receive events for each major action performed by the peer-to-peer application. For example, each time that the peer-to-peer application retrieves a file or manages other peer-to-peer content, an event can be generated and processed by the rating plug-in. In this manner, the rating plug-in remains fully informed of the operations within the peer-to-peer application, and the rating plug-in is able to maintain a client rating database that is relatively complete with respect to the content that has been retrieved by the peer node.

Alternatively, the search result post-processor may be embodied within a rating software module that acts relatively independently of the peer-to-peer application. As the peer-to-peer application performs actions with respect to retrieved content, the rating module acts as an independent monitoring agent, passively observing and passively tracking these actions. For example, the rating module could snoop on the traffic into the peer-to-peer application by monitoring the traffic on a port used by the peer-to-peer application. In addition, the rating module could monitor the directories into which the peer-to-peer application downloads its retrieved files; as files are placed into or deleted from the directory, the ratings module could monitor these events. If the port number or download directory are not standard, then the rating module could be configured to monitor the appropriate port or directory.

It should also be noted that there may be more than one search result post-processor on a peer node. Each search result post-processor may be associated with different types of searches or different peer-to-peer networks. Hence, a peer node may have more than one installed rating plug-in.

While the methodology by which the rating information is generated may vary, eventually statistics on the usage of those retrieved files are generated and placed into client rating database 324 as retrieved file usage statistics 328. By tracking the original search query that is associated with particular retrieved files, the retrieved file usage statistics can be correlated with keywords within search queries.

As noted above, the present invention is directed to rating peer nodes within a peer-to-peer network. While monitoring the usage of retrieved files provides a certain amount of information as to the usefulness of particular files, the present invention requires information about the peer nodes that are associated with the retrieved files. Hence, the identification of the originating peer node from which a file was retrieved is more important than monitoring the usage of the retrieved files. As noted above, a search query is completed by compiling a list of query hits, and assuming that the user decides that one or more files from the hit list appear to contain content that is relevant, the peer node then retrieves files from one or more peer nodes. The identity of these peer nodes from which content is downloaded may then be logged by the search result post-processor and stored within client rating database 324 as part of peer node rating values 330; the identities of the peer nodes are indexed with the keywords from the associated search query.

Figure 4:
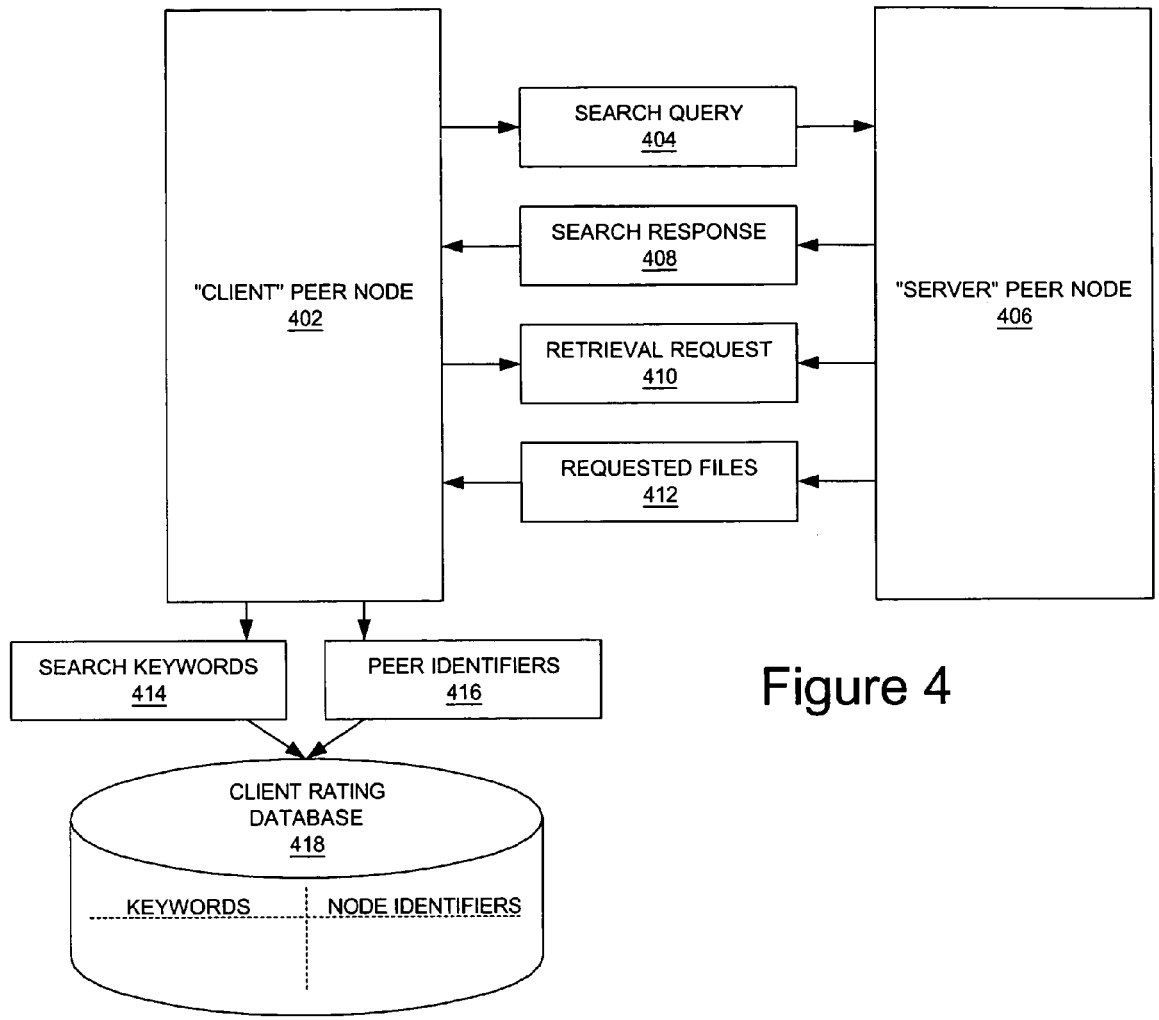
FIG. 4 is a block diagram depicting the manner in which a peer node obtains information for maintaining a client rating database in accordance with a preferred embodiment of the present invention.

With reference now to FIG. 4, a block diagram depicts the manner in which a peer node obtains information for maintaining a client rating database in accordance with a preferred embodiment of the present invention. Peer node 402, acting as a "client" or originating host within a peer-to-peer network, generates and sends search query 404 to its list of connection hosts in an attempt to find some type of content. At some point, peer node 406, acting as a "server" or receiving host within a peer-to-peer network, receives search query 404; peer node 406 may or may not be one of the nodes in the connection host list as the search query may have been forwarded from another node. In response to finding some type of content or file that satisfies the search query, peer node 406 generates search result 408 that is returned to peer node 402. In response to selecting the query hit from peer node 406, peer node 402 sends a retrieval request 410 to peer node 406, which then returns requested files 412.

At some point during the search process, although most likely after files have been retrieved, keywords 414 in the search query and associated peer node identifiers 416 are indexed into client rating database 418. Node identifiers may include an IP address, domain name, Uniform Resource Identifier (URI), etc., as necessary to identify a peer node. In other words, for each completed search query, if some type of content found by a search query is retrieved, then the identity of the peer nodes from which the content is retrieved is indexed with the keywords of the search query into the client rating database. In this manner, a set of peer nodes becomes associated with a given keyword over a period time through a series of completed search queries. Additionally, the keywords and the node identifiers can be correlated with retrieved file usage characteristics that are also stored within the client rating database.

Figure 5:
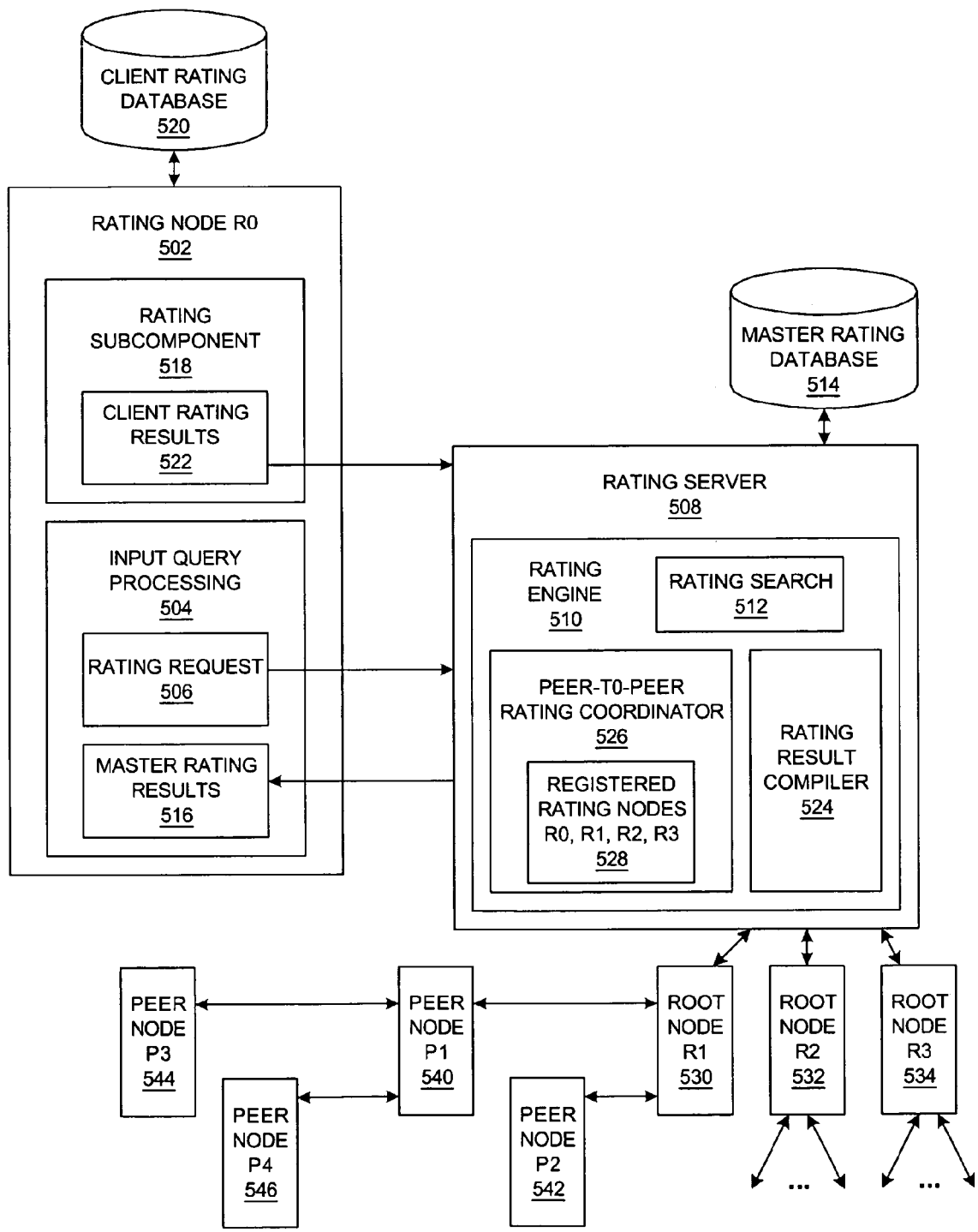
FIG. 5 is a block diagram depicting a rating server in accordance with a preferred embodiment of the present invention.

With reference now to FIG. 5, a block diagram depicts a rating server in accordance with a preferred embodiment of the present invention. In a manner similar to that shown in FIG. 4, FIG. 5 shows rating node 502 that operates a peer-to-peer application for retrieving and sharing files. At some point in time, a user at node 502 operates a peer-to-peer application that contains input query processing function 504 to enter a search query.

In prior art peer-to-peer searching systems, a peer node sends its search query to each node on a list of connection hosts. Although the user may enter identifiers for the connection hosts or retrieve a list of identifiers for connection hosts from active lists that are maintained on the Internet, the list of connection hosts may be completely useless for finding content that satisfies the newly entered search query.

In contrast to prior art peer-to-peer searching systems, the present invention uses a rating server to enhance a peer's ability to locate relevant results for searches. FIG. 5 shows a rating server that maintains rating information in a centralized manner for use by peer nodes within a peer-to-peer network. Prior to sending the search request to other peer nodes, node 502 sends rating request 506 in an appropriate message format to rating server 508. Rating request 506 contains a set of keywords that have been identified within the newly entered search request at node 502, which then waits for a response from rating server 508 before activating the peer-to-peer network search.

Rating engine 510 in rating server 508 uses rating search function 512 to find relevant nodes within master rating database 514 for the identified keywords. Using an appropriate message format, the rating server then returns a response, within master rating results 516, containing the identifiers for the nodes that the rating server has determined to be relevant for the provided keywords. Node 502 then sends the search query in an appropriate message format to one or more nodes that the rating server has selected, i.e. node 502 may use the selected nodes as root nodes for the search.

In other words, rather than randomly selecting a set of connection hosts for activating the search query, node 502 allows rating server 508 to select the nodes that prior searches have identified, as explained in more detail below, as the nodes that are mostly to contain content that is relevant to the keywords in the search query. Node 502 can use one or more of the nodes in the returned list, either exclusively or in conjunction with a connection host list that node 502 already possesses, i.e., the list may either replace or augment a previously obtained or stored connection host list.

When node 502 has received some or all of the search results to its activated search query, rating subcomponent 518 compiles the search keywords, the node identifiers of the nodes from which content was retrieved, and optionally other retrieved file usage information into client rating database 520, as explained above in more detail with respect to FIG. 3 and FIG. 4. At an appropriate time, node 502 sends client rating results 522 to rating server 508. Rating result compiler 524 compiles the client rating results received from the "client" nodes into master rating database 514. Although rating server may also be a peer node within the peer-to-peer network, the rating server is preferably a dedicated server for centralizing client rating information; peer nodes may be called "client nodes" in this context because of their relationship with the centralized rating server. It should be noted that the rating server may be replaced by a set of similar servers or a set of servers that operate through the a gateway server.

It should also be noted that node 502 may be associated with multiple, independently operated, rating servers. In effect, there may be multiple rating servers distributed throughout an intranet, the Internet, or an enterprise's internal networks, each of which compile information for different purposes, different entities, different organizations, etc. As noted above, a peer node may have more than one rating subcomponent installed on a given client machine. Hence, the client machine may be associated with separate peer-to-peer networks, each having its own rating server. Alternatively, the client machine may be associated with multiple, organizationally overlapping, peer-to-peer networks with multiple rating servers.

The timing by which the client rating results are sent to the rating server may vary depending on the implementation of the system. For example, node 502 may send its rating information to the rating server in many ways: on a predetermined, periodic basis; on an individually negotiated basis; on a predetermined, non-periodic, scheduled basis; on request by the rating server; and on request by the rating client.

As should be apparent from the description provided above, the present invention uses a rating server to facilitate successful search queries within a peer-to-peer network. The rating server accepts rating information from rating clients within the peer-to-peer network and then compiles the rating information into a master rating database. Those rating clients, acting as peer nodes, may then tap the master rating database to discover the peer nodes that potentially host the most relevant content for a particular search query. In this manner, the peer-to-peer network uses the rating server in a type of feedback loop in which the peer-to-peer network gains intelligence about the content that is being hosted within the peer-to-peer network.

To maintain the integrity of the master rating database and the quality of cooperation amongst the peer nodes, the rating server may also employ a registration mechanism that registers peer nodes as rating nodes. Preferably, each peer node that is being used as a rating client is registered by its user or owner with the rating server. Rating server 508 contains peer-to-peer rating coordinator 526 that maintains a list of registered rating nodes 528. As shown in FIG. 5, rating nodes 530-534 are registered with rating server 508 while other nodes in the peer-to-peer network, such as peer nodes 540-546, are not registered.

As is well-known in the art, a Web site can allow a user to register at the Web site, thereby creating some type of personal account for the user that is probably stored on a server within the Web site's domain. When the user registers with the server operator, rating service, or other entity as necessary, the user supplies both technical information and optional personal information.

The user must supply technical information so that the server can establish a peer-to-peer connection with the user's computer or similar device. The technical information may include an IP address, a port number, and other data items. Alternatively, the user supplies some sort of electronic address that is eventually transformable into a destination address within a network protocol. Hence, other types of addresses in place of or in addition to IP addresses may be used as appropriate. For example, the user might supply a domain name address, which can be translated into an IP address through a domain name server in the Domain Name System (DNS). In that case, the server may be configured to accept many different kinds of traffic in addition to peer-to-peer networking traffic, but because the server can discern peer-to-peer packets, the server can process peer-to-peer packets appropriately while also processing Web-page requests and other types of data traffic.

Most peer-to-peer networks operate in an anonymous fashion. However, in order to protect the integrity of the rating service, the rating service operator might also require that a registered peer node must be associated with a person. This will enable the rating service operator to maintain the integrity of the rating service and to communicate with the operators of the registered nodes. The user might supply personal information that may include such data items as name, address, age, e-mail address, phone number, etc.

When rating server 508 receives client rating result 522, rating coordinator 526 may perform a check to ensure that the client that is submitting the rating information has previously registered with the rating server; if not, the rating server may disregard client rating results from peer nodes that have not registered. In this manner, the registration mechanism reduces the chances and/or probability of success of a denial-of-service attack. In addition, the registration mechanism provides some accountability concerning the rating information that has been submitted.

As noted above, a peer node may be associated with multiple rating servers and may support multiple rating subcomponents or plug-ins. These associations would presumably occur through multiple registration operations. Preferably, when the peer node registers with the rating server to become a rating client, the rating server installs a rating subcomponent or plug-in on the client machine. Hence, the registration mechanism provides the rating server with some control and tracking ability over the use and updating of the rating subcomponents/plug-ins that are distributed throughout the peer-to-peer network.

Non-registered nodes 540-546 may gain some indirect benefit by associating with registered nodes 530-534. When a non-registered node sends a search query to a registered node, the registered node may have recently updated its list of connection hosts with node identifiers of nodes that are particularly relevant to the search query, and as the search query fans out, the non-registered node may receive high-quality search hits for its search query. The degree to which non-registered nodes could "freeload" from registered nodes is described in more detail further below with respect to FIG. 6.

Figure 6:
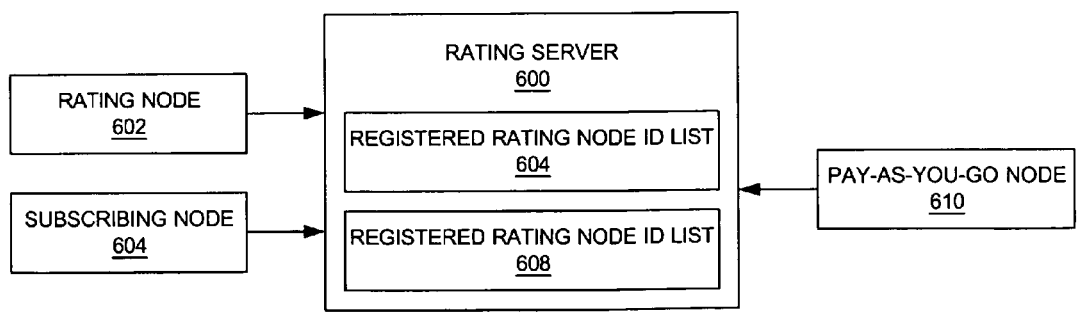
FIG. 6 is a block diagram depicting a categorization of peer nodes within a peer-to-peer network for purposes of determining financial relationships between the users of peer nodes and the operators of rating servers.

With reference now to FIG. 6, a block diagram depicts a categorization of peer nodes within a peer-to-peer network for purposes of determining financial relationships between the users of peer nodes and the operators of rating servers. As noted above, if a registration mechanism is used within a peer-to-peer network that is implementing the present invention, users of some peer nodes may register with the rating server while other user do not register their peer nodes. Assuming that the peer-to-peer network comprises a portion of the Internet, i.e., the peer-to-peer network is not entirely contained within an enterprise, then it can be assumed that the operator of the rating server desires to generate a profit with a rating server that uses rating servers in accordance with the present invention.

By recognizing that users of the peer nodes have different needs and desires, the present invention allows different financial arrangements to be established amongst the users of the peer nodes. For example, maintaining a collection of files that are relevant to a particular subject may require significant time and resources by the owner or user of a peer node. However, some users may desire to perform the maintenance duties in return for some type of compensation.

Hence, some users may register their nodes as rating nodes. For example, rating server 600 registers rating node 602 and maintains registered rating node identifier list 604. In return for submitting client rating results, rating server may allow rating clients to access the master rating database for free. Alternatively or additionally, the operator of the rating server may share a percentage of the profits with the owners of the rating nodes in accordance with a negotiated formula.

Registered nodes that have high bandwidth connections and many links to other nodes may have significant physical resources dedicated to the operation of peer-to-peer functions. However, these nodes are most likely to benefit from a compensation scheme as they may perform more operations that result in more relevant search hits. The compensation scheme can be structured to take such characteristics into consideration.

While these compensation transactions may be monetary in nature, other compensation schemes may be used, such as reward program points, coupons, micropayments, cashbacks, rebates, frequent flyer miles, etc. The registered operator/owner can supply a indication as to the preferred type of compensation. In addition, information such as a bank account number, reward program account number, etc., may be needed to complete the compensation transaction.

Other users may not desire to maintain a collection of files but may desire to access the master rating database when performing a peer-to-peer search. Hence, some users may register their nodes as subscribing nodes. For example, rating server 600 registers subscribing node 606 and maintains registered subscribing node identifier list 608. The operator of the rating server may then charge the account associated with the subscribing node or the subscribing node's user for each individual access or for a period of access to the master rating database in accordance with a predetermined or negotiated formula.

Other users may desire only sporadic access to the master rating database when performing a peer-to-peer search. Hence, some users may not desire to forego registering with the rating server in any manner. In this case, rating server 600 accepts rating requests from pay-as-you-go node 610 as long as node 610 also engages in some type of compensation transaction to pay for each access, e.g., via micropayments or other types of electronic funds transfer.

With reference now to FIG. 7A, a flowchart depicts a process for initiating a search on a peer node within a peer-to-peer network in accordance with the present invention. The process begins with a peer node optionally registering with a rating service (step 702). As part of the optional registration process, the peer node may optionally install a rating plug-in for the rating service (step 704).

At some point in time, the peer node receives a search query from a user of the peer node (step 706). The peer node then acts like a "client" node and sends a rating request containing search query keywords to a rating server (step 708). The peer node subsequently receives node identifiers in the master rating results that are returned from the rating server (step 710). The peer node then uses the retrieved node identifiers as root nodes in a peer-to-peer search using the previously entered search query (step 712). The process of activating the search query is then complete.

With reference now to FIG. 7B, a flowchart depicts a process on a rating server for obtaining master rating information on behalf of a peer node prior to activating a search at the peer node in accordance with the present invention. The process begins with the rating server receiving from a "client" node a rating request containing keywords (step 720). The rating server then searches the master rating database for matching keywords (step 722) and retrieves node identifiers associated with matching keywords (step 724). The rating server then sends the master rating results to the requesting "client" node (step 726), and the server process is complete.

With reference now to FIG. 7C, a flowchart depicts the processing of search results at a peer node within a peer-to-peer network in order to generate a master rating database in accordance with the present invention. The process begins with the peer node receiving search hits from other peer nodes in response to an activated search query (step 730). The peer node retrieves one or more files corresponding to the search hits (step 732). The peer node then captures node identifiers of nodes used for retrieval (step 734) and also optionally captures retrieved file usage statistics (step 736). The peer node compiles client rating results (step 738) and forwards the client rating results to a rating server (step 740), which compiles client rating results from multiple peer nodes into a single master rating database. The process of generating rating results is then complete.

The advantages of the present invention should be apparent in view of the detailed description of the invention that is provided above. Prior art peer-to-peer searching methodology did not centrally coordinate the activities of peers within a peer-to-peer network in any manner. When a user desired to initiate a current search, the user would be required to rely on personal search experience for guidance in limiting the current search to productive nodes without assistance from the peer-to-peer network.

Rather than relying solely on a "blind" search of a peer-to-peer network, the present invention is directed to providing assistance from a centralized server that contains rating information to target a peer-to-peer search to those nodes within a peer-to-peer network that previous search have shown those nodes to contain relevant content. The results from prior search processes are combined so that the user that is initiating a current search will receive an improved search result with more information than a search result from blindly searching the peer-to-peer network.

The connectivity and independence of nodes within peer-to-peer networks has been heralded as an important development in pervasive computing. However, the elimination of centralized intelligence in prior art peer-to-peer networks severely limits their potential usefulness. For example, peer-to-peer networks can generate substantial amounts of data traffic. Peer-to-peer searches can quickly fan out to many nodes, and the data traffic among those nodes can increase substantially when the nodes are actively processing and forwarding search requests and responses, thereby hindering the performance of the entire network. In fact, these weaknesses may have enabled prior art peer-to-peer networks to continue to operate. The development of peer-to-peer networks has been somewhat constrained by the limited ability of each node within the network to support a small number of connections with other nodes in addition to similar computational constraints. Otherwise, peer-to-peer applications may have physically overloaded many networks, including the Internet.

In contrast, with the present invention, the overall peer-to-peer network accumulates inherent intelligence in the manner in which searches are initiated. The more that the peer-to-peer network and centralized rating server is used, the more useful it becomes. As peer-to-peer searches are completed on newly added nodes and newly added content within nodes, searches become both quicker and more accurate. Since each new search can be quickly targeted to nodes that will most likely return relevant results, searches can be completed more quickly with more relevant results in comparison with prior art peer-to-peer searching methods. In addition to satisfying users of the peer-to-peer network, the present invention reduces the data traffic on the peer-to-peer network, thereby allowing the network to support more searches or other peer-to-peer applications.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. An apparatus for searching for information within a distributed data processing system, the apparatus comprising a processor coupled to a memory, wherein the memory comprises instructions that are operable by the processor for performing steps of:

obtaining a list of one or more keywords from a search query entered by a user of a first peer node;

sending a rating request message comprising the list of one more keywords to a server;

receiving a rating response message comprising a list of node identifiers from the server, wherein each listed node identifier identifies a node within a peer-to-peer network from which a file has previously been retrieved in response to a peer-to-peer search that used a keyword in the list of one or more keywords;

initiating a peer-to-peer search from the first peer node by sending a search query message to a plurality of peer nodes, wherein the search query message comprises the search query, and wherein the plurality of peer nodes includes at least one peer node identified in the list of node identifiers from the server;

receiving a result of the peer-to-peer search at the first peer node; and storing the result of the peer-to-peer search.

2. An apparatus for facilitating a search for information within a distributed data processing system, the apparatus comprising a processor coupled to a memory, wherein the memory comprises instructions that are operable by the processor for performing steps of:

receiving at a server a rating request message comprising a list of one more keywords from a peer node;

searching a rating database for matching keywords;

retrieving a list of one or more node identifiers for peer nodes in a peer-to-peer network that are associated with the matching keywords;

sending to the peer node a rating response message comprising the list of node identifiers, wherein each listed node identifier identifies a node within a peer-to-peer network from which a file has previously been retrieved in response to a peer-to-peer search that used a keyword in the list of one or more keywords;

receiving the rating response message comprising the list of node identifiers at the peer node; and storing the list of node identifiers at the peer node.

3. A computer program product in a computer readable medium for use within a distributed data processing system for searching for information, the computer program product comprising:

instructions to obtain a list of one or more keywords from a search query entered by a user of a first peer node;

instructions to send a rating request message comprising the list of one more keywords to a server;

instructions to receive a rating response message comprising a list of node identifiers from the server, wherein each listed node identifier identifies a node within a peer-to-peer network from which a file has previously been retrieved in response to a peer-to-peer search that used a keyword in the list of one or more keywords; and instructions to initialize a peer-to-peer search from the first peer node by sending a search query message to a plurality of peer nodes, wherein the search query message comprises the search query, and wherein the plurality of peer nodes includes at least one peer node identified in the list of node identifiers from the server.

4. A computer program product in a computer readable medium for use within a distributed data processing system for facilitating a search for information, the computer program product comprising:

instructions to receive at a server a rating request message comprising a list of one more keywords from a peer node;

instructions to search a rating database for matching keywords;

instructions to retrieve a list of one or more node identifiers for peer nodes in a peer-to-peer network that are associated with the matching keywords; and instructions to send to the peer node a rating response message comprising the list of node identifiers, wherein each listed node identifier identifies a node within a peer-to-peer network from which a file has previously been retrieved in response to a peer-to-peer search that use a keyword in the list of one or more keywords.

5. The apparatus of claim 1 wherein the instructions are further operable by the processor for performing steps of:

receiving from a second peer node a search result message for the peer-to-peer search comprising a node identifier for the second peer node; and retrieving from the second peer node a file identified by the search result message.

6. The apparatus of claim 1 wherein the instructions are further operable by the processor for performing steps of:

registering the first peer node with the server.

7. The apparatus of claim 1 wherein the instructions are further operable by the processor for performing steps of:

receiving a rating module from the server; and installing the rating module on the first peer node.

8. The apparatus of claim 2 wherein the instructions are further operable by the processor for performing steps of:

receiving client rating information from the peer node; and indexing the client rating information from the peer node with client rating information from additional peer nodes into the rating database.

9. The apparatus of claim 2 wherein the instructions are further operable by the processor for performing steps of:

initiating a financial transaction for a user or an owner of the peer node in response to accepting a request to access the rating database.

10. The apparatus of claim 2 wherein the instructions are further operable by the processor for performing steps of:

registering the peer node at the server.

11. The computer program product of claim 3 further comprising:

instructions to receive from a second peer node a search result message for the peer-to-peer search comprising a node identifier for the second peer node; and instructions to retrieve from the second peer node a file identified by the search result message.

12. The computer program product of claim 3 further comprising:

instructions to register the first peer node with the server.

13. The computer program product of claim 3 further comprising:

instructions to receive a rating module from the server; and instructions to install the rating module on the first peer node.

14. The computer program product of claim 4 further comprising:

instructions to receive client rating information from the peer node; and instructions to index the client rating information from the peer node with client rating information from additional peer nodes into the rating database.

15. The computer program product of claim 4 further comprising:

instructions to initiate a financial transaction for a user or an owner of the peer node in response to accepting a request to access the rating database.

16. The computer program product of claim 4 further comprising:

instructions to register the peer node at the server.

17. The apparatus of claim 5 wherein the instructions are further operable by the processor for performing steps of:

capturing a node identifier for the second peer node from which the file was retrieved; and storing at the first peer node the node identifier in association with the list of one or more keywords.

18. The apparatus of claim 7 wherein the rating module is installed as part of a process of registering the first peer node with the server.

19. The apparatus of claim 10 wherein the instructions are further operable by the processor for performing steps of:
   downloading a rating module to the peer node.

20. The apparatus of claim 10 wherein the instructions are further operable by the processor for performing steps of:
   identifying the registered peer node as a subscribing peer node, wherein a subscribing peer node receives access to the rating database for a periodic fee.

21. The computer program product of claim 11 further comprising:
   instructions to capture a node identifier for the second peer node from which the file was retrieved; and
   instructions to store at the first peer node the node identifier in association with the list of one or more keywords.

22. The computer program product of claim 13 wherein the rating module is installed as part of a process of registering the first peer node with the server.

23. The computer program product of claim 16 further comprising:
   instructions to download a rating module to the peer node.

24. The computer program product of claim 16 further comprising:
   instructions to identify the registered peer node as a subscribing peer node, wherein a subscribing peer node receives access to the rating database for a periodic fee.

25. The computer program product of claim 16 further comprising:
   instructions to identify the registered peer node as a rating peer node, wherein a rating peer node is allowed to submit client rating information to the server.

26. The apparatus of claim 17 wherein the instructions are further operable by the processor for performing steps of:
   generating client rating information at the first peer node, wherein the client rating information comprises data relating the one or more keywords and one or more captured node identifiers; and
   sending the client rating information to the server.

27. The apparatus of claim 17 wherein the instructions are further operable by the processor for performing steps of:
   capturing file usage statistics for the retrieved file; and
   storing at the first peer node the file usage statistics in association with the list of one or more keywords.

28. The apparatus of claim 10 wherein the instructions are further operable by the processor for performing steps of:
   identifying the registered peer node as a rating peer node, wherein a rating peer node is allowed to submit client rating information to the server.

29. The computer program product of claim 21 further comprising:
   instructions to generate client rating information at the first peer node, wherein the client rating information comprises data relating the one or more keywords and one or more captured node identifiers; and
   instructions to send the client rating information to the server.

30. The computer program product of claim 21 further comprising:
   instructions to capture file usage statistics for the retrieved file; and
   instructions to store at the first peer node the file usage statistics in association with the list of one or more keywords.

31. The computer program product of claim 25 further comprising:
   instructions to provide the rating peer node with access to the rating database for no fee.

32. The computer program product of claim 25 further comprising:
   instructions to provide the rating peer node with access to the rating database for a predetermined fee.

33. The apparatus of claim 26 wherein the client rating information comprises data relating file usage statistics for the retrieved file and the one or more captured node identifiers.

34. The apparatus of claim 28 wherein the instructions are further operable by the processor for performing steps of:
   providing the rating peer node with access to the rating database for no fee.

35. The apparatus of claim 28 wherein the instructions are further operable by the processor for performing steps of:
   providing the rating peer node with access to the rating database for a predetermined fee.

36. The computer program product of claim 29 wherein the client rating information comprises data relating file usage statistics for the retrieved file and the one or more captured node identifiers.

* * * * *